June 12, 1956

E. L. CLINE 2,749,747

CHASSIS DYNAMOMETER CONSTRUCTION

Filed Sept. 24, 1947

Inventor
Edwin L. Cline
By Bacon + Thomas
Attorneys

June 12, 1956 — E. L. CLINE — 2,749,747
CHASSIS DYNAMOMETER CONSTRUCTION
Filed Sept. 24, 1947 — 8 Sheets-Sheet 5

Inventor
Edwin L. Cline
By Bacon + Thomas
Attorneys

June 12, 1956 E. L. CLINE 2,749,747
CHASSIS DYNAMOMETER CONSTRUCTION
Filed Sept. 24, 1947 8 Sheets-Sheet 6

Inventor
Edwin L. Cline
By Baron + Thomas
Attorneys

June 12, 1956

E. L. CLINE

2,749,747

CHASSIS DYNAMOMETER CONSTRUCTION

Filed Sept. 24, 1947

Inventor
*Edwin L. Cline*
By *Bacon + Thomas*
Attorneys

June 12, 1956   E. L. CLINE   2,749,747
CHASSIS DYNAMOMETER CONSTRUCTION
Filed Sept. 24, 1947   8 Sheets-Sheet 8

Inventor
*Edwin L. Cline*
By *Bacon + Thomas*
Attorneys

United States Patent Office 2,749,747
Patented June 12, 1956

2,749,747

CHASSIS DYNAMOMETER CONSTRUCTION

Edwin L. Cline, Pasadena, Calif., assignor to Clayton Manufacturing Company, El Monte, Calif., a corporation of California Application September 24, 1947, Serial No. 775,768

5 Claims. (Cl. 73—117)

This invention relates to dynamometers for general use in testing motor vehicle engine performance and more particularly to hydraulic dynamometers for use in analyzing engines of motor vehicles and for detecting malfunctions or defects in other parts of the motor vehicle, such as the transmission, differential, etc. Chassis dynamometers, according to the present invention, may be of a portable or stationary type, but in either event are so designed as to duplicate as nearly as possible all kinds of load conditions encountered in driving a vehicle on the highway.

Chassis dynamometers embodying the principles of the present invention may include two long solid rolls of relatively small diameter so spaced and mounted that slippage, tire-to-roll noise, and noises due to vibration are reduced to a minimum, thus providing a quiet running dynamometer which is conducive to a quality of engine and running gear analysis not attainable with prior known chassis dynamometers.

Chassis dynamometers, according to the present invention, may also include a flywheel for enabling the same to check certain vehicle functions that normally can be observed only by road testing, for example, the rate of acceleration or deceleration under various load conditions, the vehicle speeds at which the shifting of gears in automatic or semi-automatic motor vehicle transmissions takes place, etc.

One of the more important features of the invention is that the flywheel-equipped chassis dynamometers disclosed herein completely eliminate all necessity for road testing of vehicles to check adjustments made in the shop and this results in very economical servicing costs, and what is equally important, definitely assures customer satisfaction.

The necessity for road testing of vehicles for proper servicing has heretofore been imperative in conjunction with certain types of work. For example, with the advent of automobiles equipped with automatic or semi-automatic transmissions, which have created numerous new service problems in their maintenance and proper adjustment, the prevalent practice has been to make shop adjustments to the best of the mechanic's ability and to then take the car out of the shop and run it over an open road to ascertain whether the adjustments made are proper. This obviously results in the wasting of a great deal of time.

In order to effect accurate adjustment of automatic or semi-automatic transmissions on a chassis dynamometer, to make certain that shifting will occur at the predetermined vehicle speeds for which the transmissions have been designed and to, at the same time, eliminate the necessity for road testing, the function of some means for duplicating the inertia effects of a vehicle due to its momentum must be correlated with the action of the power absorption means. It was found that the use of a properly designed flywheel in conjunction with a hydraulic brake unit presented a very satisfactory solution to this problem.

The principal object of the invention is to provide a chassis dynamometer suitable for testing all types of motor vehicles under conditions simulating as nearly as possible those encountered on the road.

Another object of the invention is to provide a dynamometer of the hydraulic type particularly adapted for use in automobile servicing establishments, breaking-in engines, in petroleum or automotive research laboratories to conduct engine block dynamometer tests, etc.

A further object of the invention is to provide a chassis dynamometer which operates with exceptionally little noise and particularly one in which the tire-to-roll noise as well as the roll bearing noise and vibration have been eliminated or reduced to a minimum.

A still further object of the invention is to provide a chassis dynamometer capable of testing a motor vehicle on substantially an even keel with the front wheels of the vehicle resting upon the floor.

Another object of the invention is to provide a chassis dynamometer having its rolls arranged close to the level of the floor thereby eliminating the usual elevated runways employed for supporting the entire vehicle above the floor level while it is undergoing test.

Another object of the invention is to provide a chassis dynamometer that does not require a pit and which, nevertheless, does not require raising the dynamometer frame and rolls to a substantial height above the floor level.

Another object of the invention is to provide a chassis dynamometer particularly adapted for use in checking the operation of and/or to facilitate proper adjustment of automatic and semi-automatic transmissions.

Another object of the invention is to provide a chassis dynamometer that will satisfactorily duplicate "road feel" indoors and eliminate all necessity for road testing of a vehicle, and thereby save the great amount of time normally consumed in making such tests.

Another object of the invention is to provide a pit-type chassis dynamometer that requires a pit of minimum depth and whose rolls are disposed substantially flush with the floor.

Another object of the invention is to provide means for use with a chassis dynamometer for testing motor vehicles which is capable of duplicating inertia loads similar to those due to the momentum of a moving vehicle on the road.

Still another object of the invention is to provide a complete chassis dynamometer apparatus which is compact, relatively simple in construction, low in cost, and which can be readily transported from one locality to another, if desired, or permanently mounted in position.

Further objects and advantages of the invention will be apparent from the following description taken in conjunction with the accompanying drawings, in which.

Figure 1:
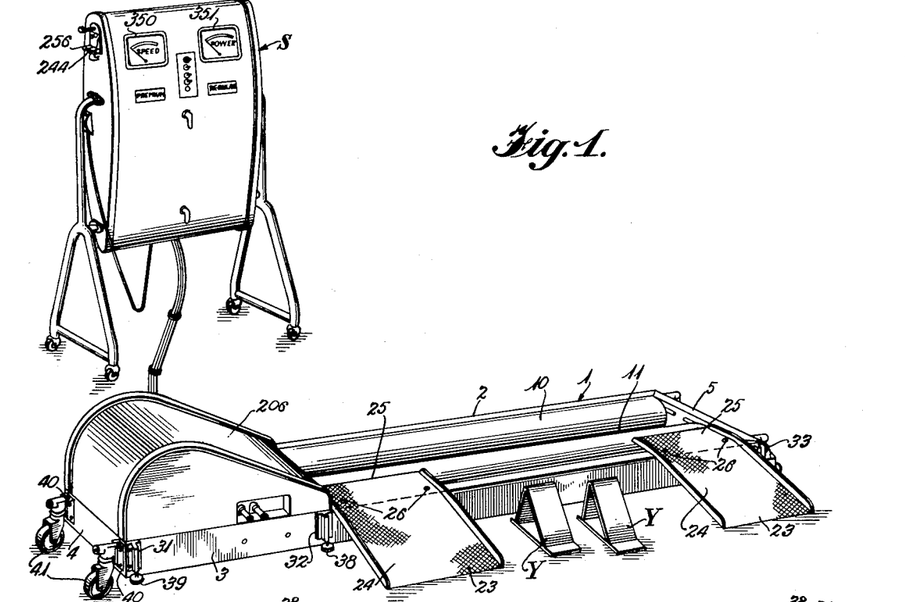
Fig. 1 is a perspective view of one form of a portable chassis dynamometer apparatus embodying the principles of the present invention.
Figure 2:
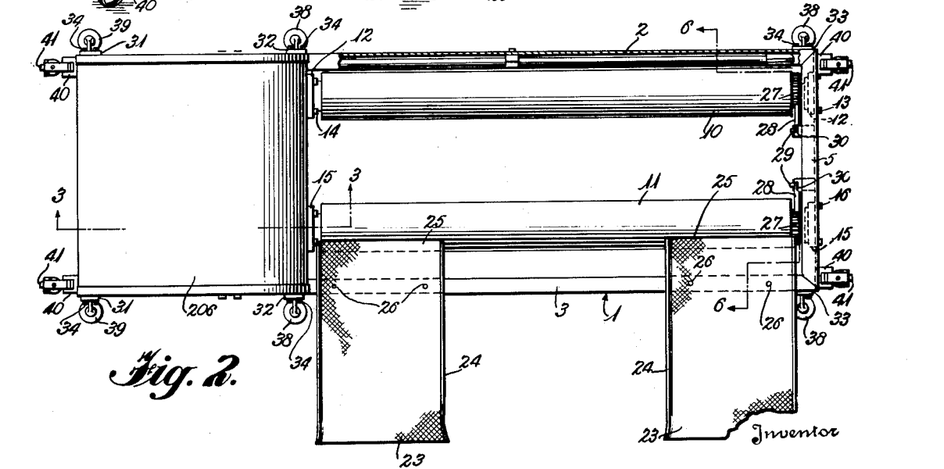
Fig. 2 is a plan view of the chassis dynamometer shown in Fig. 1.
Figure 3:
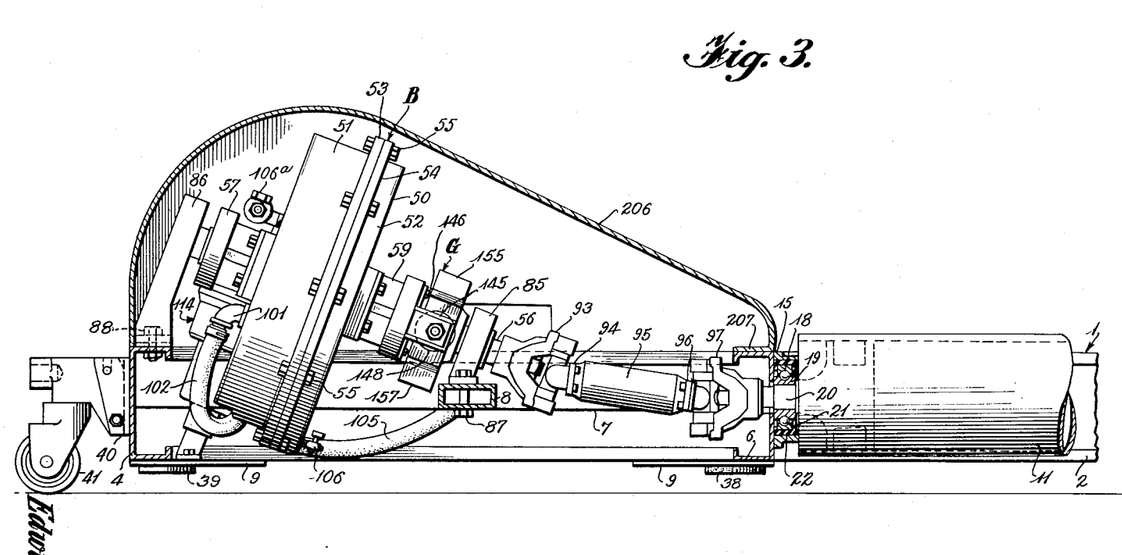
Fig. 3 is an enlarged view partly in section taken on the line 3—3 of Fig. 2, and particularly illustrating the dynamometer unit supported by its casters, with the hydraulic brake unit in elevation and one of the bearings of the dynamometer drive roll in cross-section.
Figure 6:
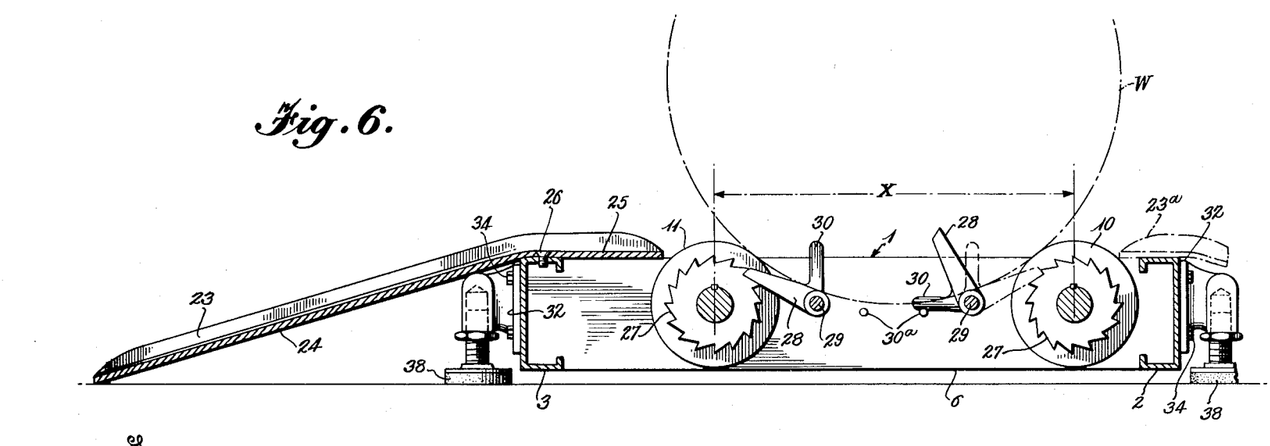
Fig. 6 is an enlarged sectional view taken on the line 6—6 of Fig. 2, particularly illustrating a ratchet mechanism for locking either of the dynamometer rolls, but with the dynamometer frame supported by the floor-engaging feet instead of the casters.

Referring now to Figs. 1, 2, 4 and 6 of the drawings, the portable chassis dynamometer frame is substantially rectangular in plan and is generally identified by the numeral 1. The frame 1 comprises longitudinally extending side members 2 and 3 spaced apart and interconnected by transverse end members 4 and 5 and an intermediate transverse member 6. All of the members 2–6 are preferably made of structural steel generally C-shaped in cross-section, as best indicated in Figs. 3 and 6. The transverse members 4 and 6 are connected by a longitudinally extending section 7, and the section 7 is connected to the side member 3 by a short transverse member 8. The frame 1, as a whole, is stiffened by six gusset plates 9 positioned on the underside of the frame at each corner thereof and adjacent the transverse member 6. The parts 2 to 9, inclusive, are preferably welded together and provide a very rigid frame structure. However, it will be understood that these parts may be riveted or otherwise secured together, if desired.

A pair of dynamometer rolls 10 and 11 is mounted horizontally within the frame 1 between the transverse members 5 and 6. The rolls 10 and 11 are of a length sufficient to be engaged by both rear wheels of a motor vehicle, whereby the natural frequency of vibration of the rolls is reduced somewhat, thus avoiding resonance. The rolls are also balanced to avoid dynamic vibration during rotation. The roll 10 is an idler and is supported at its oposite ends in bearing blocks 12, one of which is secured to the end member 5 by bolts 13 and the other of which is secured to the intermediate transverse member 6 by bolts 14. The roll 11 serves as a driver or power take-off for transmitting the power from the rear wheels of a motor vehicle to the brake unit B of the dynamometer. The roll 11 is mounted in bearing blocks 15 similar to the bearing blocks 12. One of the bearing blocks 15 is secured to the end member 5 by bolts 16 and the other bearing block is secured to the intermediate transverse member 6 by bolts 17.

Fig. 3 illustrates in detail the manner in which the rolls are supported in the bearing blocks. All of the bearing blocks 12 and 15 are similar in construction and, hence, a description of one will suffice for all. Each of the rolls is supported at its opposite ends in ball bearings 18, the inner element 19 of which is carried on a reduced extension 20 of the rolls 10—11 and the outer element 21 of which is received in a rubber grommet 22 carried by the bearing blocks 12, 15 and serving as a noise insulating material. As is shown, the grommet 22 is annular and generally U-shaped in transverse cross-section and partially surrounds the outer ball bearing element 21. The use of the rubber mounted ball bearings at the opposite ends of the rolls is conducive to very quiet operation of the rolls. The rolls 10 and 11 are arranged with their axes parallel and are spaced a predetermined distance apart, indicated by the dimension X (Fig. 6). The spacing of the rolls 10 and 11 has been found to be an important factor in reducing slippage, tire wear, and the tire-to-roll noise encountered so often in motor vehicle dynamometers. It has been found, in actual practice, that satisfactory operation of the rolls 10 and 11 can be obtained with average sizes of conventional tires by making said rolls seven inches in diameter and spacing the axes thereof apart a distance (X) of nineteen and three-quarters inches, although this distance is not absolutely critical and good results can be obtained with a spacing slightly more or less than that specified. It will be understood, of course, that the distance X for optimum operation will vary with the diameter of the rolls used.

A pair of ramp members 23 is provided to enable the vehicle to be backed onto the rolls 10 and 11 for test purposes. Each of the ramps 23 includes an inclined portion 24 and a substantially horizontal portion 25, the latter portion resting upon the upper edge of the side member 3 and having an extremity in close proximity to the periphery of the roll 11. The ramps 23 are maintained in operative relation to the side member 3 by means of removable screws 26 which enable the ramps 23 to be readily detached when desired.

Ordinarily no difficulty is experienced in backing a vehicle onto the rolls 10 and 11. However, in order to drive the vehicle off the rolls it is necessary to lock at least one roll against rotation. To accomplish this, each of the rolls 10 and 11 (Figs. 1 and 6) carries a ratchet wheel 27 at the end thereof near the frame member 5 adapted to be engaged by a manually operable pawl 28 pivotally mounted upon a pin 29 and having an integral arm 30 adapted to be grasped by the operator to effect engagement or disengagement of the pawl. The arms 30 are adapted to engage stop pins 30ª to limit their movement to retracted position. The pawl 28, associated with the roll 10, is shown retracted and normally is not used unless a set of back-off ramps 23ª is provided for mounting on the frame member 2.

In view of the possibility that the floor surface upon which the portable dynamometer is to be used may not be substantially level, the frame 1 carries three pairs of adjustable supporting feet, one pair 38—38 being disposed adjacent each of the ends of the rolls 10 and 11 and a third pair 39—39 being disposed adjacent the left extremity of the frame, as best shown in Fig. 2. Each pair of feet is associated with a pair of brackets 31, 32 and 33 secured to the side members 2 and 3 of the frame 1 by bolts 34.

The end frame members 4 and 5 of the frame 1 each carry a pair of brackets 40 to receive retractable and readily detachable casters 41. These casters are of the swivel type, and, when in their advanced position, maintain the frame 1 with its supporting feet clear of the floor, thereby enabling the dynamometer unit to be easily moved from one place to another.

The details of construction of the dynamometer frame supporting feet 38 and 39 and of the retractable casters 41 form no part of the subject-matter claimed in the instant application. Accordingly, a detailed description thereof herein is deemed unnecessary. However, the supporting feet and casters are fully described, and claimed in my copending application Serial No. 775,767, filed of even date herewith, now Patent No. 2,707,877, and which is a division of my parent application Serial No. 443,833, filed May 20, 1942, now Patent No. 2,452,550.

Figure 4:
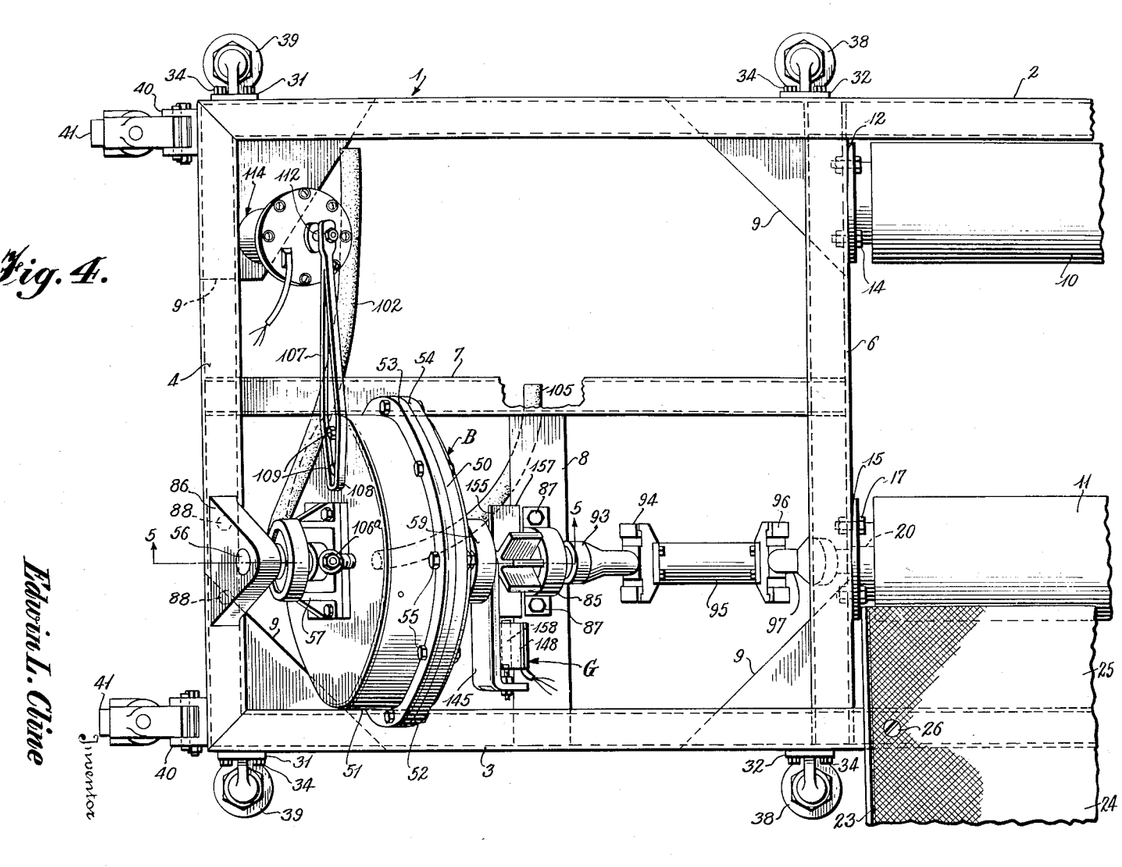
Fig. 4 is a plan view of the apparatus shown in Fig. 3 with the hood removed revealing the hydraulic brake unit and particularly illustrating the manner in which the hydraulic brake unit is mounted upon the dynamometer frame and drivingly interconnected with one of the dynamometer rolls.
Figure 5:
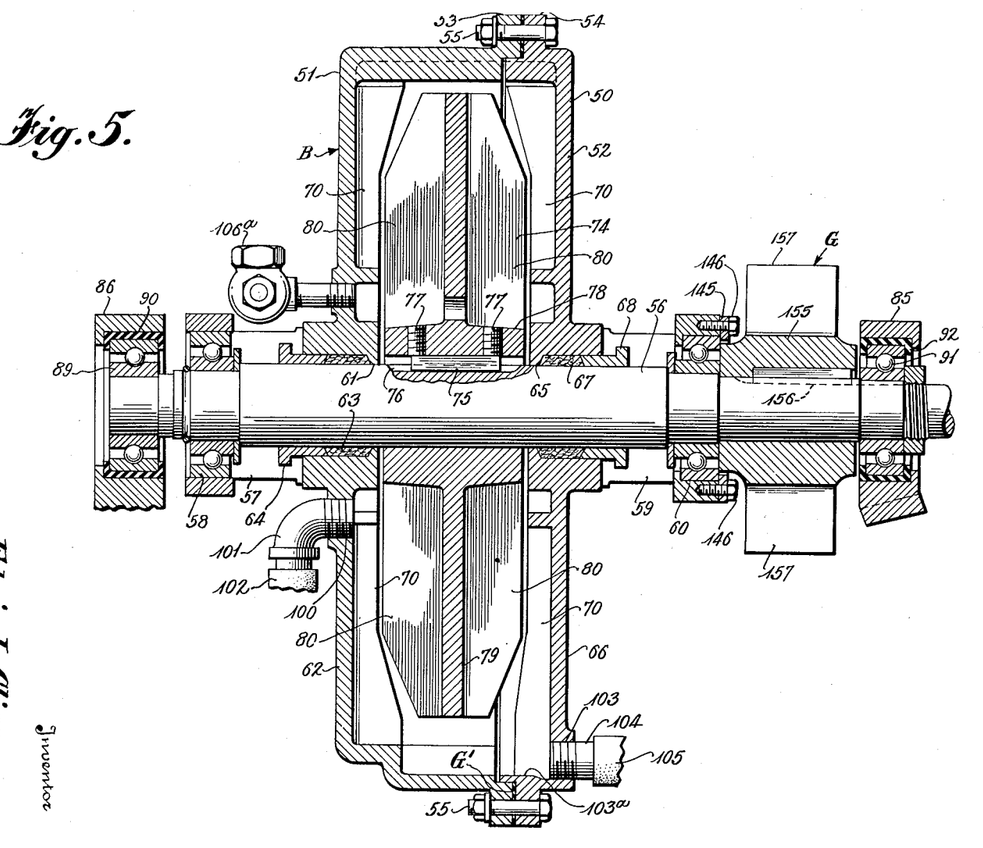
Fig. 5 is an enlarged sectional view taken on the line 5—5 of Fig. 4.

The brake or power absorption unit of the dynamometer is generally indicated by the letter B and is best shown in Figs. 3 to 5. This unit includes a drum-like casing or housing 50 consisting of two sections 51 and 52 having annular portions terminating in radially extending flanges 53 and 54, respectively, suitably apertured to receive bolts 55, which hold the sections together. A suitable gasket material G' is applied to the confronting faces of said flanges to form a seal. A brake shaft 56 extends through the housing sections 51 and 52. The section 51 carries a bracket 57 in which is mounted a ball bearing 58 providing a support for one end of the shaft 56 and the section 52 carries a somewhat similar bracket 59 in which is mounted a ball bearing 60 forming a support for the opposite end of said shaft. The shaft 56 extends through an opening 61 (Fig. 5) in the side wall 62 of the section 51 and is surrounded by packing 63 held in place by a packing gland 64. The shaft 56 also extends through an opening 65 in the side wall 66 of the casing 52 and is surrounded by packing 67 held in place by a gland 68. Thus, the shaft 56 is packed in each of the housing sections 51 and 52 so that no fluid can escape from the housing 50 along said shaft.

Each of the housing sections 51 and 52 is provided with integral vanes 70. A dynamically balanced power absorption rotor or brake wheel 74 is disposed in the housing 50 between the sections 51 and 52 and is secured to the shaft 56 by a key 75 received in a keyway 76 cut in said shaft. Set screws 77 extend through a hub portion 78 of the rotor 74 and retain said rotor in a central position on the shaft 56.

The rotor 74 has a central circular web 79 extending radially from the hub 78 to a point adjacent the inner peripheral surface of the housing 50. Upon each side of the central web 79 is disposed a series of radially extending substantially equally spaced vanes 80 which project from the hub 78 to the periphery of the rotor. The housing and rotor vanes cooperate to form a "working circuit" for the brake liquid, as is well understood. The arrangement and details of construction of the vanes of the brake unit are more fully described, and claimed, in my copending application Serial No. 443,833, supra, now Patent No. 2,452,550, of which the instant application is a continuation-in-part.

The brake unit B is of such capacity that the diameter of its housing 50 is much greater than the height of the frame 1. The brake unit B is mounted upon the frame 1 by bearing brackets 85 and 86 (Figs. 3 to 5), the bearing bracket 85 being secured to the short transverse frame member 8 by bolts 87 and the bearing bracket 86 being secured to the transverse end member 4 by bolts 88. As is shown in Fig. 5, the outer end of the shaft 56 carries a ball bearing 89, which is mounted in a rubber grommet or noise insulator 90 in the bearing bracket 86. The opposite end of the shaft 56 is similarly mounted in a ball bearing 91 and rubber grommet 92 in the bearing bracket 85. The bearing brackets 85 and 86 support the brake unit 50 with the axis of the shaft 56 disposed upon an angle relative to the axis of the drive roll 11 so that the lower peripheral portion of the housing 50 does not extend below the frame 1, as will be apparent from Fig. 3. The disposition of the shaft 56 upon an angle to the horizontal makes it possible to provide a chassis dynamometer of great power absorption capacity without requiring raising of the dynamometer frame and rolls to a substantial height above the level of the floor, as was the usual practice heretofore.

The brake shaft 56 (Fig. 3) carries one element 93 of a universal joint at its lowermost end and this element is connected to a cooperating element 94 carried by one end of an intermediate shaft 95. The opposite end of said intermediate shaft also carries one element 96 of a universal joint which is operatively connected to another universal joint element 97 secured to the extension 20 of the dynamometer drive roll 11. Thus, it will be apparent that rotary motion imparted to the roll 11 by the driven wheels of a vehicle will be transmitted to the brake rotor 74 through the intermediate shaft 95 and the brake shaft 56.

The housing section 51 is provided with a threaded opening 100 (Fig. 5) adjacent the hub 71 or low pressure zone of the brake unit B in which is mounted an elbow 101 connected to a section of hose 102, whereby water or other brake liquid can be returned to the housing after passing through a "closed" circulating system including a heat exchanger, not shown herein but fully disclosed, and claimed, in my copending parent application Serial No. 443,833, supra, now Patent 2,452,550. The housing section 52 has a threaded opening 103, into which is threaded a pipe nipple 104 having one end of a hose 105 connected thereto. The housing sections 50 and 51 have registering depressions providing a pocket 103a adjacent the opening 103 to facilitate displacement of the brake liquid by the rotor 74 during unloading and for circulation to the heat exchanger referred to above. The hose section 105 serves as an inlet hose for the heat exchanger and in addition is associated with water supply, drain piping and valves (not shown) for effecting loading and unloading of the brake unit B, as disclosed in my parent application, supra. The housing section 52 has a petcock 106 (Fig. 3) mounted therein at the pocket 103a to permit complete draining of the brake unit when not in use. The housing section 51 has an air check valve 106a mounted in the side wall 62 thereof to permit air to enter the brake unit B and prevent the formation of a vacuum therein whenever water is drained from said brake unit.

The housing section 51 carries a torque arm 107 (Fig. 4). One end 108 of the torque arm 107 is secured to said housing section by bolts 109 and the opposite end of said torque arm is connected with a rod 112 forming a part of a torque bridge device 114 for, in effect, "weighing" the torque produced by the engine undergoing test, it being understood that the stator or brake housing 50 can turn relative to the axis of the shaft 56 in proportion to the load being absorbed. A voltage generator G is also associated with the brake unit B and comprises a bracket 145 secured to bracket 59 by bolts 146 and carrying a coil 148 and a horseshoe magnet 158. A rotor is secured to the shaft 56 by a key 156 (Fig. 5). The rotor 155 has arms 157 that periodically pass the ends of the horseshoe magnet 158. The generator G produces the voltage necessary to operate a speed meter 350, and in conjunction with the torque bridge 114 a horsepower meter 351. The meters 350 and 351 are conveniently mounted upon a stand S. The torque bridge device 114, generator G, and the circuit interconnecting the same with the meters 350 and 351 are more fully disclosed, and claimed, in my copending application Serial No. 775,765, filed of even date herewith, which is a continuation-in-part application of my parent application, supra. The brake unit B, the torque bridge device 114, etc., are enclosed by a cover 206 fastened in any suitable manner to the frame 1.

The aforedescribed chassis dynamometer unit is designed to meet the testing requirements of vehicles of average weight, so as to provide the widest possible field of efficient use for the unit in garages, service stations, etc. However, in some instances it may be desirable to increase the capacity of the dynamometer, or to make certain adjustments on an automatic or semi-automatic transmission, for example, or conduct certain tests requiring more accurate compensation for the exact weight of the vehicle, and this can be done by providing a flywheel which will increase the inertia of the brake unit so as to simulate the inertia effects of a vehicle on the road. Further variations can be made in the capacity of the unit, even when a flywheel is used, by adding inertia plates of a predetermined weight to the flywheel. In another form of the invention described later, the flywheel can be disconnected from the brake shaft, at will, when its function is not needed.

In connection with the use of the present flywheel-equipped dynamometer for transmission testing and adjustment work, it is relevant to note that most present-day automatic or semi-automatic transmissions are equipped with a speed-responsive governor, switches, etc., or other means for effecting automatic shifting of the transmission gears at predetermined road speeds. Practically all of these transmissions require an interruption or reversal of the driving torque to remove the load on the teeth of the gears in order to permit shifting. In some cases the torque load is relieved or reversed by release of the accelerator pedal; whereas, in other types of transmissions the accelerator pedal is "kicked down" beyond full open throttle position in order to effect a momentary interruption in the ignition circuit sufficient to enable shifting to occur at a time when the engine operation is temporarily interrupted, all as is well understood by those familiar with transmissions. During the time that the foot throttle is released or the ignition is interrupted, the vehicle normally continues to travel under its own momentum without any sudden drop in its speed, thereby normally providing an adequate time interval in which the shifting of the gears can be effected. This same condition must be duplicated on the dynamometer in order to enable satisfactory adjustments to be made in the shop. Any attempt to adjust an automatic or semi-automatic transmission while being tested on a chassis dynamometer without adequate means to compensate for the inertia of the vehicle would result in improper adjustments, because without some inertia means to assist in maintaining the speed of the vehicle wheels, the speed of said wheels would fall quickly, often preventing the shifting mechanism from completing its intended operation. In order to change the speed of a vehicle from second to third, for example, on a chassis dynamometer not equipped with a flywheel or other inertia compensating means, and in order to enable the automatic shift mechanism to operate, the operator must greatly over-speed the engine so that the mechanism can complete its shift before the vehicle wheels have been slowed down below the critical shift speed by the action of the hydraulic power absorption device. Naturally, this practice is objectionable because it makes it impossible to accurately determine the speed at which the transmission would normally shift if the vehicle were operating on the road. Therefore, actual road testing of vehicles to check transmission adjustments to ascertain their correctness was considered imperative for satisfactory automotive service work. However, the use of a flywheel in conjunction with a hydraulic power absorption device to substantially duplicate or approximate the inertia effect of the vehicle has overcome the foregoing difficulties and has made it possible to handle automatic transmission adjustments on the dynamometer without wasting the considerable amount of time ordinarily required to road-check adjustments made in the shop in accordance with previous practice.

To state the problem another way, unless sufficient inertia effect is produced to drive the rear wheels during the critical period of interrupted torque drive, the speed of the wheels and the speed of the engine fall together, or the speed of the wheels falls faster than the engine speed, making the completion of the shift impossible, or if shifting does take place, then shifting will occur at vehicle speed points differing from those at which the same would normally occur with the vehicle operating on the road.

In addition to a prolonged coasting effect produced by the flywheel to permit shifting of transmissions requiring power interruption, it is also useful in testing vehicles equipped with transmissions which shift without power interruption. The latter transmissions permit open throttle acceleration from a standstill through a series of gears, and when starting tremendously low speed torques are developed. Under such conditions the flywheel's ability to absorb power with increasing speed permits testing of vehicles so equipped by insuring sufficient time to elapse between shifts for the dynamometer operator to check the speeds at which they occur.

The principal purpose of the flywheel, therefore, is to reproduce the inertia effects of the vehicle under various conditions so that the power shift points (speeds) of the transmission will be duplicated on the dynamometer to correspond to those occurring on the road. If a power absorption means were used to absorb high torques at low speeds, tremendous and impractical sizes of brakes would be required and due to the large increase in horsepower with slight increases in speed, common with all types of brakes, complicated instruments and controls would have to be devised to keep the power absorption brake from dragging down the speed of the wheels too much at the time that the automatic transmissions made their shifts. Consequently, a flywheel represents a simple yet practical solution to the problem, in that it provides for diagnosis and adjustment of various types of transmissions. This is made possible because the flywheel is able to deliver energy to the vehicle rear wheels to keep them turning at a speed to simulate "coasting" or deceleration conditions on the road in the same manner that the momentum of the vehicle keeps it moving and the rear wheels turning while on the road with the driving torque momentarily interrupted, and also because the flywheel is capable of absorbing energy as does the weight of the vehicle on the road when increasing speed.

It is undesirable and unnecessary to have the flywheel connected with the hydraulic brake unit for all tests to which a vehicle may be subjected while on a chassis dynamometer. For example, it would be unnecessary and undesirable to have the flywheel connected with the brake unit while conducting tests to determine carburetor efficiency and fuel consumption inasmuch as the flywheel would then merely impose an abnormal load on the vehicle. Likewise, in making certain engine speed tests, or while increasing or decreasing the engine speed, the inertia effect of the flywheel would have to be overcome. Thus, in order to observe sensitive and rapid response to engine adjustments and to avoid overlooking "roughness" in the operation of the engine, the inertia flywheel should be disconnected, and should remain disconnected for all tests and adjustments of the engine that can best be made without the flywheel, although for checking performance and making adjustments of certain automatic or semi-automatic transmissions and for certain other tests, the flywheel is absolutely essential.

Figures 8, 9:
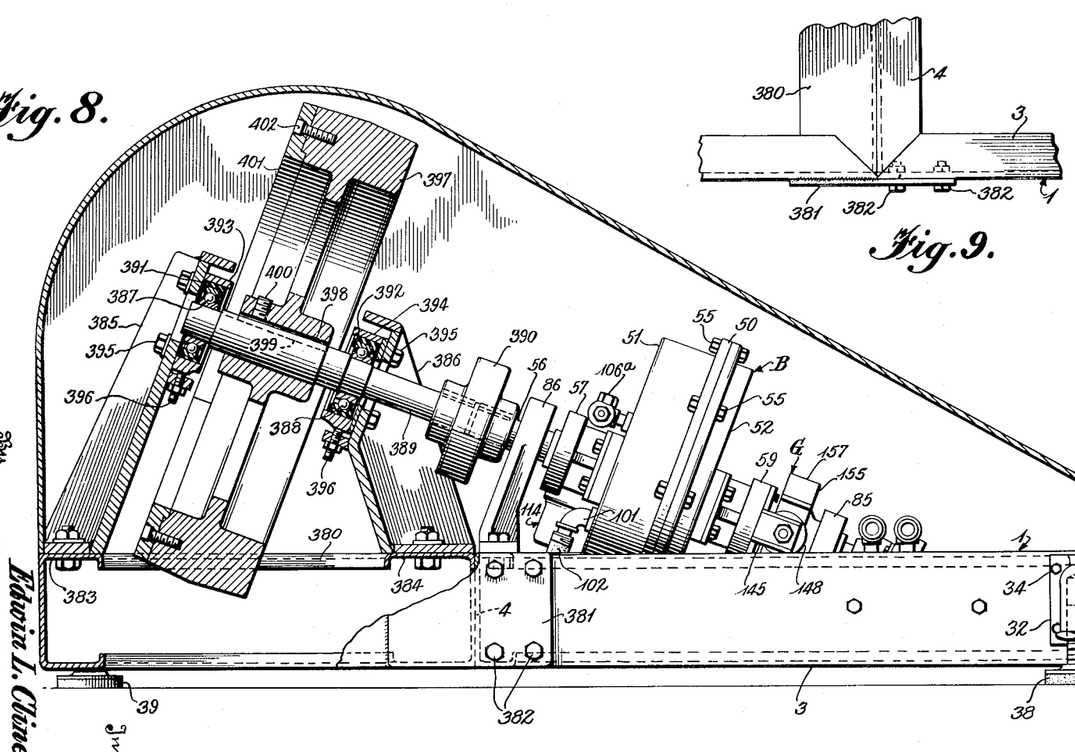
Fig. 8 illustrates a modification of the chassis dynamometer unit shown in Figs. 1 to 6, and wherein a flywheel carrying an inertia plate is shown connected with the shaft of the brake unit to greatly increase its scope of utility.
Fig. 9 is a fragmentary plan view of the unit shown in Fig. 8 illustrating the manner in which the flywheel frame is attached to the dynamometer frame.

One form of chassis dynamometer construction for accomplishing the various foregoing tests is illustrated in Fig. 8. As is here shown, a flywheel frame 380 is adapted to be connected to the brake end of the main frame 1. The flywheel frame 380 is generally rectangular in plan and is constructed from C-shaped channel sections similar to those used in fabricating the main frame 1. A plate 381 is welded to each side of the flywheel frame 380 so that a portion thereof extends beyond the end of said frame to overlap with the main frame 1. The overlapping portion of the plates 381 is secured to the main frame 1 by bolts 382.

The flywheel frame 380 includes transverse members 383 and 384 which carry brackets 385 and 386 for ball bearings 387 and 388, respectively. A flywheel shaft 389 is supported by the bearings 387 and 388 and one end of said shaft is connected to the end of brake shaft 56 by a conventional flexible coupling 390. The ball bearings 387 and 388 are mounted in rubber grommets 391 and 392 carried by adjustable supports 393 and 394, respectively. The supports 393 and 394 are adapted to be adjusted in a conventional manner by bolts 395 and screws 396 to properly axially align the flywheel shaft 389 with the brake shaft 56.

A flywheel 397 is secured to the flywheel shaft 389 by a key 398 carried in a keyway 399 formed in said flywheel shaft. A set screw 400 extends through the hub of the flywheel, locking the same against longitudinal movement relative to the key 398.

The flywheel 397 may be designed to duplicate the inertia of any given vehicle weight, but for commercial purposes is designed to duplicate the inertia of a 3,750-pound vehicle. This weight was chosen as most feasible because dynamometers equipped with the flywheel find greatest application in research laboratories, automotive maintenance shops, etc., and even light vehicles with the customary observers, equipment, etc., in them will weigh at least approximately 3,750 pounds. In order to make it possible to provide more accurate tests of rates of acceleration, reproduce various vehicle momentums, etc., the flywheel is adapted to have inertia discs 401 secured to one side thereof by screws 402. For convenience, these inertia discs may be made of two semi-circular sections to facilitate mounting upon the flywheel 397.

The flywheel 397, with or without the inertia discs 401, depending upon the weight of the vehicle, enables the dynamometer to simulate the inertia of a vehicle as it is accelerated, decelerated, or while "coasting" on a level road. Such discs can be added to the flywheel to increase its effective weight to equal the weight of vehicles up to 4,200 pounds. With the range of 3,750–4,200 pounds, it is possible to duplicate almost identically the acceleration or deceleration rate of any vehicle under level road conditions. It will be understood, however, that the flywheel 397 is not an indispensable part of the dynamometer and that chassis dynamometers embodying the principles of the invention are highly useful and give good results in certain types of work without said flywheel. However, the flywheel is indispensable for other types of work in addition to acceleration and deceleration tests, such as, in the testing and adjustment of modern transmissions.

The object of checking the rate of acceleration of a vehicle on the dynamometer for service operations, etc., is to determine the carburetor efficiency during acceleration periods, to determine numerous ignition failures, various motor drive mechanism noises, valve failures, etc.

Figure 7:
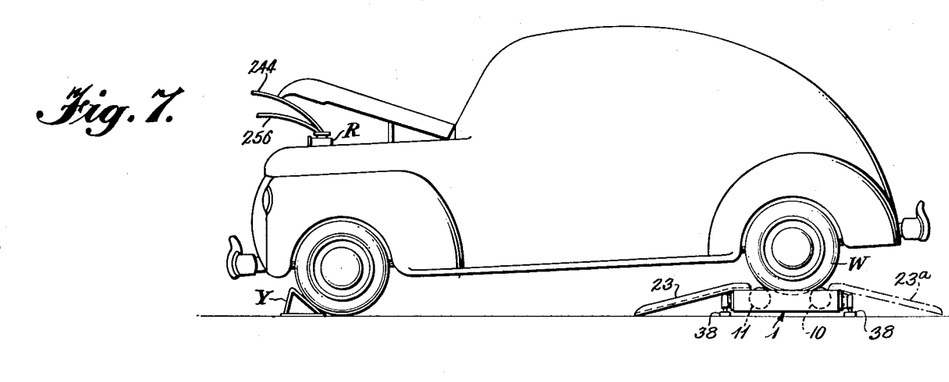
Fig. 7 diagrammatically illustrates a vehicle positioned upon the chassis dynamometer of Figs. 1 and 2 ready to be tested.

Once the dynamometer is set up, the general procedure, in preparing a motor vehicle for test to determine faulty and/or malfunctioning parts of the engine and/or other parts of the vehicle, is to back the vehicle onto the chassis dynamometer unit so that the rear wheels W are cradled between the rolls 10 and 11, as diagrammatically illustrated in Figs. 6 and 7. It will be observed from Fig. 7 that the vehicle undergoing test has its front wheels resting directly upon the floor and that the vehicle as a whole is substantially level, this being made possible by the positioning of the rolls 10 and 11 close to the floor as a result of inclining the brake shaft 56. Next, the rear tires are inflated to the proper pressure and the pawls 28 are checked to see that they are disengaged from the ratchets 27. The chocks Y are placed in front of the front wheels (see Fig. 7) as a precautionary measure to prevent the vehicle from inadvertently leaving the rolls 10 and 11, but with the present design normally the chocks Y are wholly unnecessary, inasmuch as there is no tendency whatever for the wheels to ride up on the rolls 10 and 11 during a test, regardless of the speed at which they are driven.

The ends of hose section 244 and 256 (Fig. 7) are inserted into the upper tank portion of the radiator R of the vehicle undergoing test in order to effect withdrawal, cooling and the return of the liquid in the engine cooling system to prevent overheating. The hose sections 244 and 256 are retractable into the stand S which contains an auxiliary cooling system for the engine cooling liquid. The stand S and the auxiliary cooling system are fully disclosed, and claimed, in application Serial No. 775,766, filed of even date herewith, now patent no. 2,476,837, as a division of my parent application, Serial No. 433,833, supra, now Patent No. 2,452,550.

The engine, transmission, etc., may then be run at various selected speeds and under various loads to determine their performance. Acceleration tests may also be made, as desired.

The data obtained from the foregoing tests are compared with standard performance ratings for the particular vehicle tested to aid in determining when necessary adjustments or replacements are to be made, and in determining what part of the vehicle should be repaired or adjusted. Thus, the prescribed dynamometer tests subject the parts of the engine and running gear to various conditions of operation corresponding to their most severe road use. Hence, if faulty parts exist, they will make themselves known to the operator during the test. The operator's knowledge enables him to determine what parts are subjected to their severest duty during the various tests and to make such adjustments or repairs as to place the parts in maximum operating efficiency. After the analysis has been made and the difficulties corrected, final timing and carburetor adjustments can be made while the car is still on the dynamometer and in actual operation so that it can be readily determined whether or not the parts have been adjusted to develop their maximum or best performance by comparing the readings of the speed meter 350 and horsepower meter 351 after adjustments have been made with readings of similar tests made before said adjustments. It is normally desired to test the engine on the fuel that will actually be used in the car and to adjust the carburetor, spark, etc., for best operation under the altitude at which average driving is to take place. If the vehicle is equipped with an automatic or semi-automatic transmission, then it should be tested on a flywheel equipped dynamometer so that its shifting operations can be accurately observed and adjustments made, if necessary.

Figure 10:
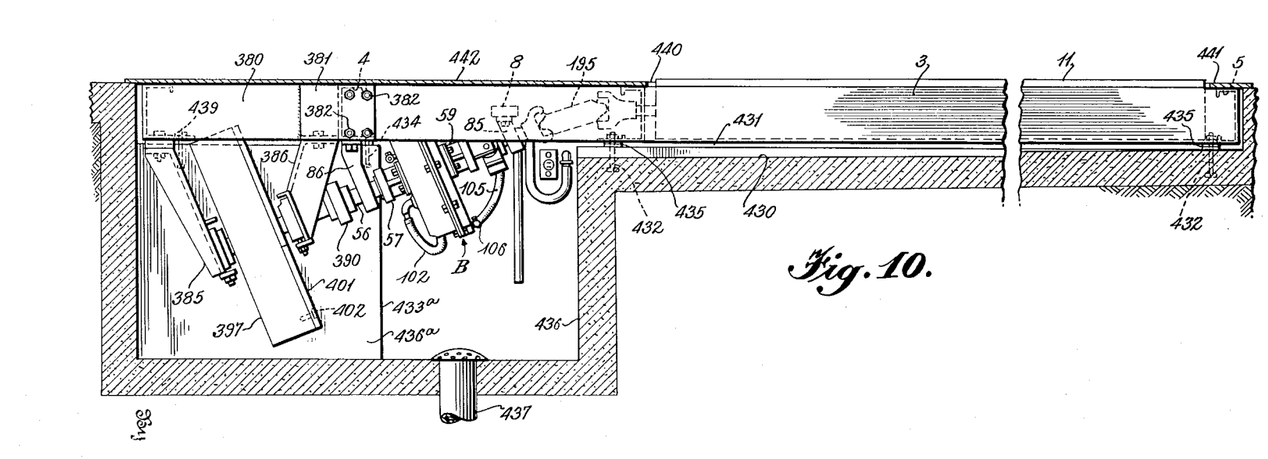
Fig. 10 is a view partly in section illustrating a pit-type chassis dynamometer having a flywheel and inertia weights associated therewith.

Fig. 10 illustrates a flush-type chassis dynamometer, that is to say, a dynamometer which is so mounted that it is substantially flush with the floor. In such mounting the floor must first be provided with a suitable pit 430 including a portion 436 to receive the brake unit B. The walls of the pit are preferably formed of concrete and include elongated pads 431 at the opposite sides thereof in which are embedded bolts 432 for securing the side members 2 and 3 of the frame 1 to said pads adjacent the ends of the rolls 10 and 11. Additional pads in the form of columns 433a are provided at the brake end of the pit 430 and have bolts 434 embedded therein for securing the end member 4 of the frame 1 to the foundation. The frame 1 is leveled up by suitable shims 435 so that it is horizontal and flush with the floor. It will be observed that in this type of installation the brake shaft 56 extends upon an angle downwardly, instead of upwardly as in the two forms of the invention previously described.

It will be readily understood that all of the necessary piping connections to the water supply and sewer can be placed below the floor level. Likewise, all conduits for electrical wiring can also be placed below the floor level.

Fig. 10 also illustrates the manner in which a pit model dynamometer can be provided with the auxiliary flywheel frame 380 and flywheel 397, similar to that shown in connection with the portable model in Fig. 8. As will be readily apparent, the pit 430 includes a portion 436a, which extends under the frame 380 and receives the flywheel 397, and the columns 433a provide a support and holding means for two additional bolts 439 for securing the flywheel frame 380 to the foundation. Any liquid discharged into the pit portions 436—436a incident to unloading of the brake unit B is drained out through a pipe 437.

Figure 11:
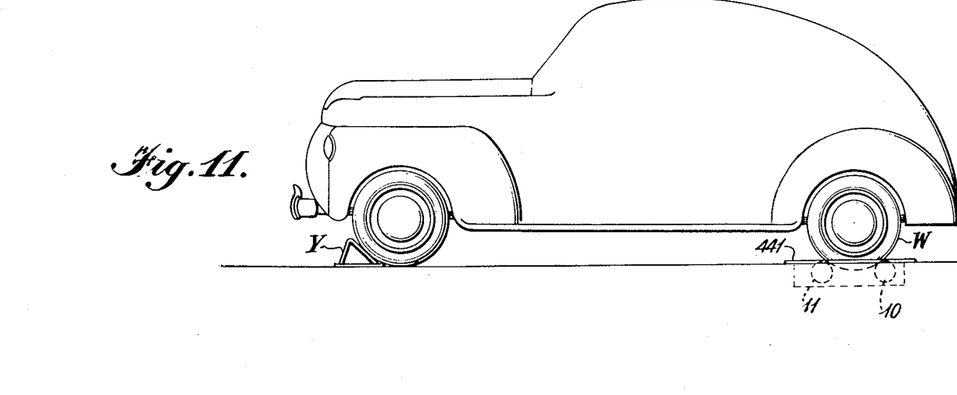
Fig. 11 diagrammatically illustrates a vehicle positioned upon the dynamometer of Fig. 10 ready to be tested.

In the flush-type of dynamometer shown in Figs. 10 and 11, the ramps 23 are, of course, dispensed with and the space between the edge of the pit and the rolls 10 and 11 is covered by side plates 440 and an end plate 441 fastened to the dynamometer frame 1 by any suitable fastening means. Likewise, the cover 206 is dispensed with and the opening in the frame above the brake unit is closed by a plate 442 which is adapted to be removed to gain access to the brake unit and other parts contained within the frame 1. Fig. 11 clearly shows the level position which the vehicle assumes while undergoing test.

Figure 12:
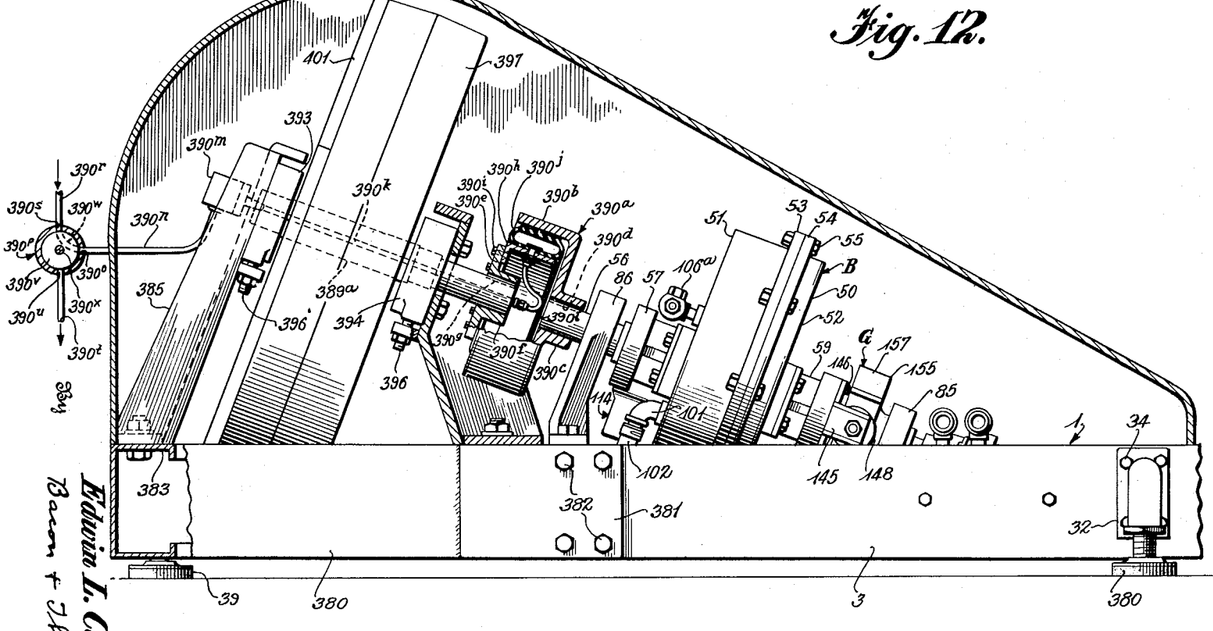
Fig. 12 is a view of a further modification of the invention illustrating, by way of example, the manner in which a flywheel may be optionally connected by a clutch with the shaft of the hydraulic brake unit of Fig. 8 in order to be driven thereby.

In the forms of the invention illustrated in Figs. 8 and 11, the flywheel shaft 389 is shown directly connected with the shaft 56 of the hydraulic brake B by a flexible coupling 390. In contrast, Fig. 12 illustrates a modified form of the invention in which a flywheel shaft 389a can be connected by an air operated clutch 399a with the shaft 56 of the hydraulic brake B, at the will of the operator, depending upon the character of test to be performed. Thus, the dynamometer of Fig. 12 combines the advantages and benefits of the two types of dynamometers shown in Figs. 3 and 8.

The clutch 399a comprises a drum 390b having a hub 390c secured to the shaft 56 by a key 390d. A plate 390e has a hub 390f secured to one end of the flywheel shaft 389a by a key 390g. The plate 390e has a flange 390h secured thereto by bolts 390i. The flange 390h is arranged concentrically within the drum 390b and an annular, inflatable, reinforced rubber member 390j is disposed between the two. The annular inflatable member 390j is suitably secured at its inner periphery to the flange 390h and is provided with a tread at its outer periphery engageable with the inner surface of the drum 390b.

The flywheel shaft 389a has a passageway 390k extending axially therethrough and a flexible conduit 390l establishes communication between the interior of the inflatable member 390j and one end of said conduit. A conventional air supply fitting 390m is mounted on the opposite end of the shaft 389a and communicates with the opposite end of the passageway 390k. It will be understood that the fitting 390m is such that it remains stationary although the shaft 389a is free to rotate with respect thereto. A tube 390n connects the fitting 390m with one port 390o of a conventional three-way valve 390p, which for simplicity has been shown in diagrammatic form. A tube 390r is connected at one end to a supply of fluid under pressure (not shown), preferably air, and its opposite end is connected with a port 390s of the three-way valve 390p. A waste pipe 390t communicates with another port 390u in the three-way valve 390p. A disc 390v is arranged within the valve 390p and is provided with an arcuate port 390w. The disc 390v is adapted to be manually rotated through a stem 390x.

It will be apparent from the position of the disc 390v shown in Fig. 12, that the port 390w is positioned to establish communication between the port 390s associated with the supply pipe 390r and the port 390o associated with the conduit 390n, so that fluid under pressure is introduced into the inflatable member 390j through the passageway 390k in the flywheel shaft 389a and the tube 390l. The introduction of fluid under pressure into the member 390j causes the same to expand with the result that the tread thereof tightly engages the drum 390b, thus establishing a driving connection between the brake shaft 56 and the flywheel shaft 389a.

It will also be apparent that when the valve disc 390v is rotated clockwise through an angle of 90°, the port 390w will establish communication between the tube 390n and the waste pipe 390t so that pressure in the inflatable member 390j is relieved to exhaust and the driving connection between the shafts 56 and 389a is interrupted. Thus, it will be apparent that the operator can readily connect or disconnect the flywheel with the brake unit B simply by turning the disc 390v through the stem 390x. However, in practice, the three-way valve 390p will preferably be operated to either effect engagement or disengagement of the clutch 390a only at a time when the brake shaft 56 is stationary. Otherwise, too great a load would be suddenly imposed upon the brake unit B and the vehicle undergoing test, or else the flywheel would continue to rotate for a long period of time due to its inertia and prevent satisfactory reconnection thereof with the brake shaft should it be desired to again use the flywheel before it had stopped.

Depending upon the character of work or service to be performed, a dynamometer such as that shown in Fig. 3 without a flywheel may be selected, or a dynamometer such as that shown in Fig. 8 with a flywheel more or less permanently coupled with the brake shaft may be used, or a dynamometer such as that shown in Fig. 12 with a manually controlled air clutch interposed between the brake unit B and the flywheel 397 may be employed in installations where it is desired to obtain the combined advantages and benefits of the dynamometers shown in Figs. 3 and 8.

While the hydraulic brake units and the flywheels disclosed herein have been shown associated with a chassis dynamometer, it is to be understood that they are not limited to use with such particular forms of dynamometers, and that the same can obviously be mounted upon a stand and used in making certain engine tests with the engine also mounted upon a suitable stand.

It will be further understood that various changes may be made in the details of construction and arrangement of the parts shown herein without departing from the spirit of the invention or the scope of the appended claims.

I claim:

1. In a chassis dynamometer, a generally rectangular horizontal frame comprising longitudinally extending side members and a plurality of transverse members interconnecting said side members; a pair of horizontal rolls adapted to be driven by a driven wheel of a vehicle; means rotatably supporting said rolls between a pair of adjacent transverse members with the lower periphery of said rolls disposed above the lower side of said frame; a brake unit of greater diameter than the height of said side members and including a brake shaft; bearing means independent of said roll supporting means mounted upon certain of said transverse members supporting said brake unit for rotation of said shaft about an axis inclined with respect to the axis of one of said rolls and with said brake unit extending only beyond one side of the horizontal plane of said side members; means drivingly interconnecting said brake shaft with one end of said one roll; a flywheel and a flywheel shaft; bearing means mounted upon certain of said transverse members supporting said flywheel shaft inclined and in axial alignment with said brake shaft and with said flywheel extending only beyond said one side of said side members; and clutch means for coupling said brake shaft and flywheel shaft in driving relation.

2. In a dynamometer, a horizontal frame comprising longitudinally extending side members and a plurality of transverse members interconnecting said side members; a pair of horizontal rolls; means rotatably supporting said rolls between a pair of adjacent of said transverse members with the lower periphery of said rolls disposed above the lower side of said frame; an inclined brake unit including a housing of greater diameter than the height of said side members and a brake shaft extending through said housing; bearing means mounted upon certain of said transverse members rotatably supporting said brake unit between said side members with the housing extending only beyond one side of the horizontal plane of said side members; an intermediate shaft; a universal joint connecting one end of said intermediate shaft with one end of said one roll; a second universal joint connecting the opposite end of said intermediate shaft with one end of said brake shaft; a flywheel and a flywheel shaft; bearing means mounted upon certain of said transverse members supporting said flywheel shaft inclined and in axial alignment with said brake shaft; and clutch means for coupling said brake shaft and flywheel shaft in driving relation.

3. A chassis dynamometer for testing the engine of a motor vehicle, comprising: a hollow substantially rectangular frame; a horizontal idle roll and a horizontal drive roll adapted to be engaged by a driven wheel of a vehicle; bearing means rotatably supporting said rolls within said frame; a brake unit including a housing of greater diameter than the height of said frame and a brake shaft extending through said housing; bearing means rotatably supporting said housing and brake shaft within said frame with the axis of said brake shaft inclined relative to the axis of said drive roll and with said housing extending only beyond one side of the horizontal plane of said frame; means connecting said brake shaft with said drive roll; an auxiliary frame; means securing said auxiliary frame to said first-mentioned frame; a flywheel and a flywheel shaft; bearing means rotatably supporting said flywheel shaft on said auxiliary frame with the axis of said flywheel shaft inclined and aligned with the axis of said brake shaft; and means for drivingly interconnecting said shafts.

4. In a chassis dynamometer for testing motor vehicles, a power absorption device including a housing and a brake shaft extending through said housing, said housing and brake shaft being inclined to the horizontal; a pair of parallel horizontal rolls positioned to be simultaneously engaged by the same vehicle wheel; means connecting one end of one of said rolls with one end of said inclined brake shaft; a flywheel and a flywheel shaft, said flywheel shaft being axially aligned with said inclined brake shaft, the other end of said brake shaft having a drum mounted thereon and said flywheel shaft carrying an inflatable member engageable with said drum for drivingly interconnecting said shafts; and means for introducing operating fluid into said inflatable member.

5. In a chassis dynamometer for testing motor vehicles, horizontal frame means comprising longitudinally extending channel members and a plurality of transversely extending channel members interconnecting said longitudinally extending members; a pair of rolls; means rotatably supporting said rolls horizontally between a pair of adjacent of said transverse channel members; a brake unit including a brake shaft; bearing brackets of different height mounted upon certain of said transverse members rotatably supporting said brake shaft on an angle relative to the horizontal axis of one of said rolls; an intermediate shaft; a universal joint connecting one end of said intermediate shaft with one end of said one roll; a second universal joint connecting the opposite end of said intermediate shaft with one end of said brake shaft; a flywheel and a flywheel shaft; bearing brackets of different height mounted upon certain of said transverse channel members supporting said flywheel shaft in axial alignment with said inclined brake shaft, the angle of inclination of said brake and flywheel shafts being such that said brake unit and flywheel project only beyond one side of the horizontal plane of said frame means; and means for coupling said inclined brake shaft and flywheel shaft in driving relation.

References Cited in the file of this patent
UNITED STATES PATENTS

| | | |
|---|---|---|
| 1,044,121 | Beall | Nov. 12, 1912 |
| 1,106,684 | Simonds | Aug. 11, 1914 |
| 1,192,381 | Bresson | July 25, 1916 |
| 1,964,532 | Platzer | June 26, 1934 |
| 2,130,833 | Bennett | Sept. 20, 1938 |
| 2,149,122 | McCall | Feb. 28, 1939 |
| 2,162,159 | Cole | June 13, 1939 |
| 2,246,978 | Kraft | June 24, 1941 |

FOREIGN PATENTS

| | | |
|---|---|---|
| 578,341 | Germany | Oct. 30, 1933 |
| 887,967 | France | Nov. 29, 1943 |